United States Patent
Freifeld

[11] Patent Number: 6,160,910
[45] Date of Patent: Dec. 12, 2000

[54] HIGH PRECISION THREE DIMENSIONAL MAPPING CAMERA

[76] Inventor: Daniel Freifeld, 32 Clapboard Hill Rd., Westport, Conn. 06880

[21] Appl. No.: 09/245,434

[22] Filed: Feb. 5, 1999

Related U.S. Application Data
[60] Provisional application No. 60/110,598, Dec. 2, 1998.

[51] Int. Cl.[7] .................................................. G06K 9/00
[52] U.S. Cl. ............................................ 382/154; 382/151
[58] Field of Search .................................. 382/141, 148, 382/154, 209, 282, 284, 299, 151; 348/86, 87, 92, 129; 356/3.1, 376; 700/163

[56] References Cited

U.S. PATENT DOCUMENTS

| | | |
|---|---|---|
| 4,385,360 | 5/1983 | Yamada et al. .......................... 382/154 |
| 4,752,964 | 6/1988 | Okada et al. ............................ 382/154 |

*Primary Examiner*—Bhavesh Mehta
*Attorney, Agent, or Firm*—Handal & Morofsky

[57] ABSTRACT

An optical imaging apparatus having focusing optics, a linear array of detectors positioned in a focal plane outputting an image of a portion of an object which is placed on a platform having a moveable mounting responsive to horizontal and vertical mechanical drive forces thereby moving the platform to known horizontal and vertical positions while images of the object are captured by the linear array and output to a computer which compiles the sectional images and generates a composite image of the object allowing measurements to be taken.

18 Claims, 9 Drawing Sheets

HIGH PRECISION THREE DIMENSIONAL MAPPING CAMERA

This application claims the benefit of U.S. Provisional Ser. No. 60/110,598 filed Dec. 2, 1998.

BACKGROUND OF THE INVENTION

1. Field of the Invention

The present invention relates to high precision cameras of the type which are used to capture a video image of an object with enough precision to allow information to be derived from the video image sufficient to provide accurate measurements of the object for purposes of quality control or other applications requiring accurate dimensional information.

2. Description of Related Art Including Information Disclosed under 37 CFR 1.97 and 37 CFR 1.98

Even the human eye with its remarkable ability to capture huge amounts of optical information cannot make measurements with precision and accuracy sufficient for quality control of parts requiring highly precise tolerances. Failure to achieve proper measurements can result in a wide range of problems. For example, failure to maintain dimensional tolerances for parts in an automobile engine may result in problems ranging from decreased system life to increase probability of failure under out of the ordinary conditions. Even where later system testing at a manufacturing facility can detect problems resulting from failure to meet dimensional tolerances, unacceptably high rejection rates on account of defective systems can result.

Moreover, even when human eye is capable of performing a required inspection, such factors as fatigue, lighting, distraction and so forth make human inspection unreliable.

Today, in an attempt to minimize those applications where human optical inspection is employed, to avoid the sometimes unpredictable problems caused by fatigue, distraction and other factors, industry has turned increasingly toward the implementation of computerized inspection systems. With such systems, however, the resolution of the optical inspection apparatus is far below that of the human eye.

Currently, many electronic imaging cameras use two dimensional arrays of light sensitive elements, sometimes of the type known as charged coupled devices (CCD) as photodetectors. The purpose of these devices is to convert an optical image into a video image. There are many relatively low priced color and black and white array CCD detectors available for video imaging, but they produce low quality images, as alluded to above. More particularly, CCD detectors and other video imaging devices suffer from a relatively low pixel count. For example, CCD photodetector arrays have the ability to produce quality images with a resolution of approximately 2048 by 2048 pixels. However, these arrays are presently very expensive. Moreover, these very large arrays tend to have defects such as inoperative pixels, inoperative clusters of pixels, or inoperative lines of pixels. When very high quality images are required this type of electronic imaging system is not only very expensive. Such systems may not even be capable of performing a high-quality, high precision measurement.

Linear photodetectors cost much less than array detectors because they have far fewer pixels and thus have correspondingly much higher manufacturing yields. Linear photodetectors, obviously, however, are capable of imaging only one line of information in an image that any given point in time using the single line of photo sensitive devices which they have. Accordingly, the linear photodetector must therefore scan the entire image, line by line.

The same is achieved by using a mechanical scanning assembly for moving the linear photodetector across the image plane in the camera. Generally, systems of this type derived image data by 1) relying upon the precision of the steady state operation of the mechanical scanning assembly, 2) assuming identical transient translational movements during the initiation of a scan, and 3) assuming that translational movement is uniform over time. Such a system, while suitable for making high quality digital images for commercial photography, is inappropriate for use in making high precision measurements.

More particularly, mechanical irregularities in the scanning assembly make the generation of highly precise image information impossible, thus making the image data captured by such systems on suitable for the purpose of confirming dimensional tolerances in a precision manufacturing environment.

Accordingly, it would be advantageous to have a device that will capture a single image of a part with enough precision that accurate measurements can be made of the features of such a part.

SUMMARY OF THE INVENTION

The invention, as claimed, is intended to provide a remedy. It solves the problem of how to provide a linear array-based camera with the capacity of capturing a three dimensional image of a part with enough precision to allow accurate measurements of part features to be made. Moreover, the same is achieved using a positional encoding technique highly insensitive to transient and steady state mechanical tolerances in the mechanical scanning system.

In accordance with the present invention, a positional encoder is coupled to a scanning line array detector. The scanning mechanism moves the linear array along the image plane of a lens. As the linear array moves, each time a predetermined number of resolution steps, corresponding to a resolved distance, are measured by the encoder, the linear array is directed to acquire a line image. In this way, an array of line images, which are precisely spaced, are generated, allowing the precise construction of the entire image on one focal plane. The linear array and focusing optics can then be moved vertically to a different focal plane of the object. The vertically movement of the assembly is in predetermined increments, and also measured by a positional encoder. The scanning process is then repeated on the second focal plane. After repeating the process for all required focal planes, the entire three dimensional image may then be sent to a computer which, using known techniques for detecting object boundaries from digital images, determines the dimensional position and configuration of the features and compares them to the standard, determining whether the same are within specified tolerances.

Alternatively, in accordance with the present invention the linear array can remain stationary while the three dimensional image of the object is captured. This is accomplished by placing the object on a stage in a known position coupled to a horizontal positional encoder, then horizontally moving the stage through the image capture area of the linear array. As the stage moves, the computer will signal the linear array to send an image back to the computer at a predetermined increment. The linear array and focusing optics can then be vertically moved to a predetermined vertical position corresponding to a ew focal plane of the image. Then the horizontal imaging process can be repeated for each new focal plane of the image.

After repeating the process for all required focal planes, the entire three dimensional image may then be sent to a computer which, using known techniques for detecting object boundaries from digital images, determines the dimensional position and configuration of the features and compares them to the standard, determining whether the same are within specified tolerances.

Alternatively, in accordance with present invention the linear array can sequentially acquire an image based on a clock pulse internal to the camera or data acquisition electronics. In this case, the positional encoder is used to precisely control the speed of the scanning mechanism and line image acquisition is synchronized to provide a desired number of pixels per unit length in the direction of scanning, thus achieving high-resolution imaging and the stability needed for precision measurements.

More particularly, in order to compensate for repeatable non-linearities and inconsistencies in scanner motion, a high precision optical reticle comprised of a number of fiducial indices is employed. The reticle is optically projected onto a portion of the image plane where the linear array is scanning. More particularly, the reticle may be projected to form an image which coincides with the path of one or more photosensitive elements at one end of the linear detector array. In this way an image of the indices will be present on the captured image. From these indices a computer system can calculate the appropriate pixel to inch ratio for the image and further compensate for any non-linearities and inconsistency in scanning motion.

As an alternative to this structure for determining the position of the linear array, and electromagnetic transducer, of the type having printed circuit primary convolutions on a printed circuit scale and secondary convolutions on a printed circuit slider may be employed.

An optical illumination system can be coupled to the motion of the scanning linear array detector, such that a suitably intense bar of illumination can be projected only on the area of the part that is currently being imaged onto the linear array. This optical system will typically comprise a point source of light such as a laser or LED coupled to a telecentric lens by a cylindrical optical lens and a beamsplitter placed in front of the scanning linear array. Moreover, the same optics which image a part on the linear photodetector array will function equally well at the same time to project light onto the area of part being scanned by the camera. From the point of view of the point on the part being imaged and within the field of view, the illumination will appear to be coming from the image plane. This illumination bar could also have a repeating pattern that will effectively be focused on the part within the field of view.

BRIEF DESCRIPTION OF THE DRAWINGS

One way of carrying out the invention is described in detail below with reference to the drawings which illustrate one or more specific embodiments of the invention and in which.

DESCRIPTION OF THE PREFERRED EMBODIMENTS

Figure 1:
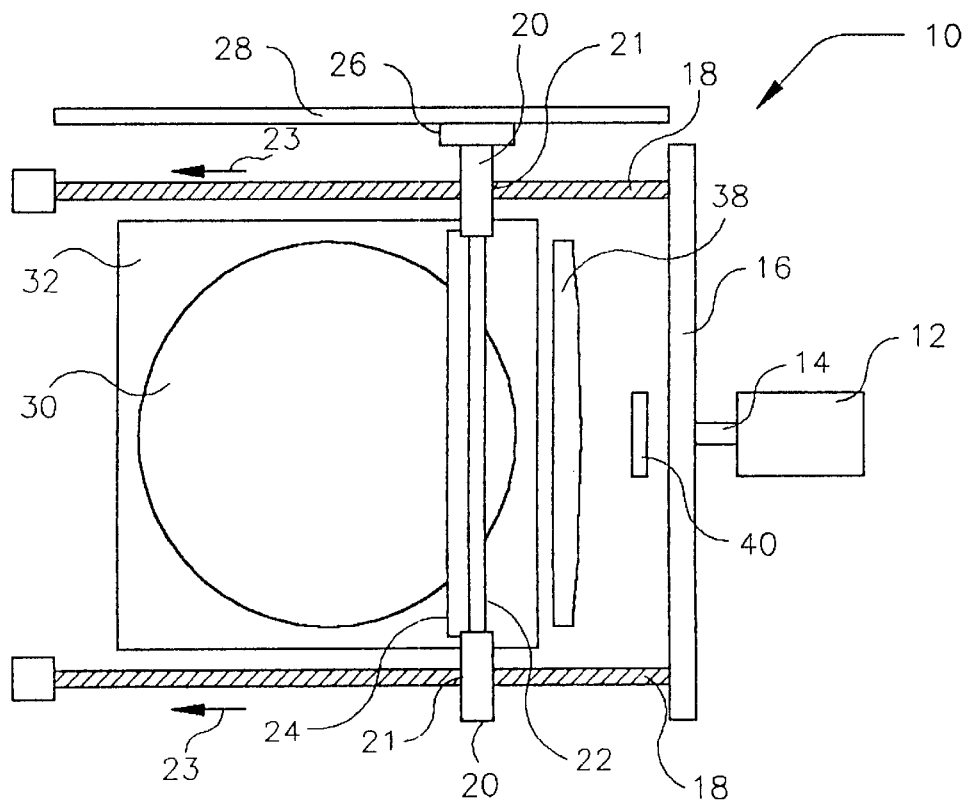
FIG. 1 is a top view of a precision dimensional camera constructed in accordance with the present invention.

Referring to FIG. 1, a high precision framing camera constructed in accordance with the present invention is illustrated. Line scan camera 10 can be driven by a motor 12 coupled to a gearbox 16 by a drive shaft 14. Rotation of drive shaft 14 by motor 12 causes gears within gearbox 16 to rotate drive screws 18.

Drive screws 18 are threaded to mate with a tapped block support 20. Support 20 defines within itself a threaded hole 21, whose threads mate with the threads on its respective drive screw 18. Rotation of the drive screws 18 will cause supports 20 to move in the directions indicated by arrow 23. In accordance with preferred embodiment of the invention, both of the drive screws 18 have identical pitch threads. Accordingly, translational movements of each of the supports 20 are identical to each other. Whether translational movement will be to the right or to the left will depend upon the direction of angular movement of screws 18.

A linear array 22 comprises a plurality of detectors 25. In accordance with a preferred embodirLent, line array 22 has approximately 4096 detectors arranged in a straight line, one adjacent the other. An array suitable for use of present invention is the CCD array manufactured by Dalsa Inc. of Waterloo, Ontario Canada and sold under its part number IL-PI array.

Alternatively, a time delay and integrate sensor may be used to increase light collection and illumination efficiency of the system.

Line array 22 is mounted on and extends between the two supports 20, whereby translational movement of the supports 20 results in a corresponding translational movement of the array 22. In accordance with the preferred embodiment of the invention, an elongated light source 24 is also coupled to this assembly, by having each of its ends secured to one of the supports 20. Because of the proximity of light source 24 to line array 22, light source 24 is coupled to the same optical system by means of a beam splitter as detailed below.

In the embodiment illustrated in FIG. 1, an electromagnetic position transducer is employed to determine the translational position of linear array 22. A positional encoder 27 comprises a slider 26 is mounted on one of the supports 20. Slider 26 is electromagnetically coupled with scale 28 to provide a signal which allows precise detection of the position of linear array 22. Once the linear array has reached each of a set of predetermined points, as determined by slider 26, at which points line images are to be acquired, the image output of the linear array is downloaded to form a line in the raster image being acquired by the camera. A complete image can then be reconstructed by combining the line images associated with all of the points in the set of predetermined points. The spacing of these lines is based on the distance between reads as determined by slider 26.

Figure 2:
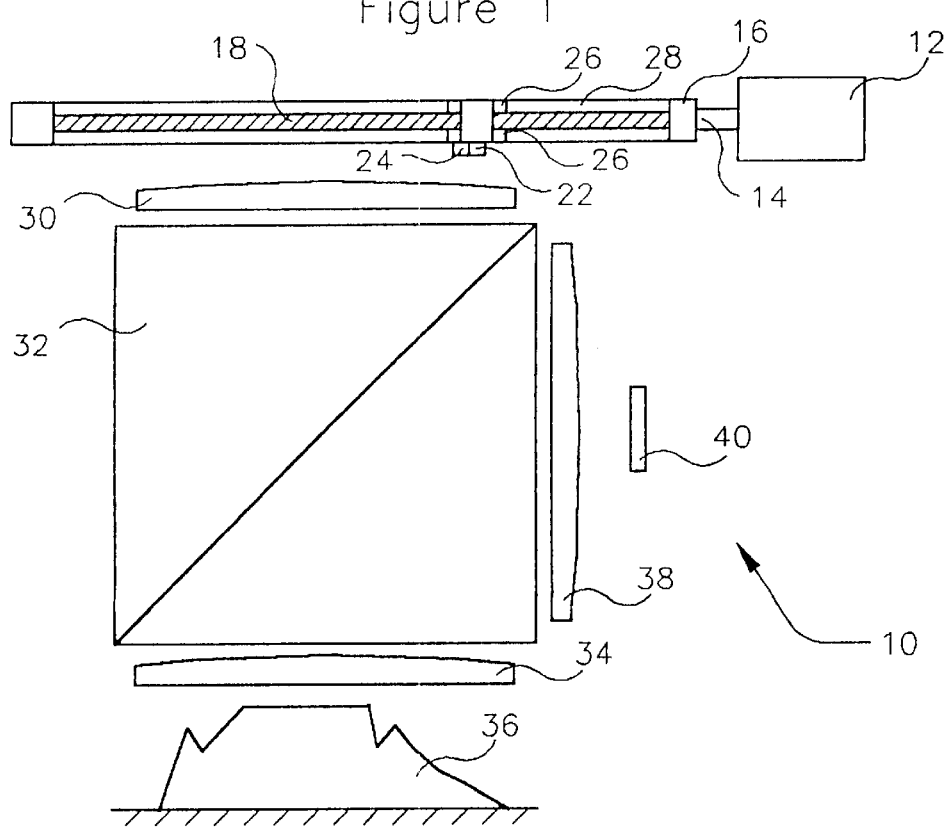
FIG. 2 is a side elevational view of the camera illustrated in FIG. 1.

For the purpose of focusing an image in the image plane, line scan camera 10 is equipped with a coupling lens 30, as is illustrated most clearly in FIG. 2. A fifty percent reflective and fifty percent transmissive beamsplitter 32 is positioned below lens 30. Beamsplitter 32 passes a portion of the light, forming the image of an object 36 being imaged, coming from object 36 through objective lens 34 toward coupling lens 30. Coupling lens 30 functions to image the object being imaged in image plane 37 where it is captured by the linear array.

Beamsplitter 32 also reflects a portion of the light, forming the image of the object being imaged, and coming from object 36 through objective lens 34 to another coupling lens 38. Coupling lens 38 couples this image to a camera 40, a standard resolution 768×492 pixel video camera Cohu Model 2100, for viewing by an individual monitoring the system.

Figure 3:
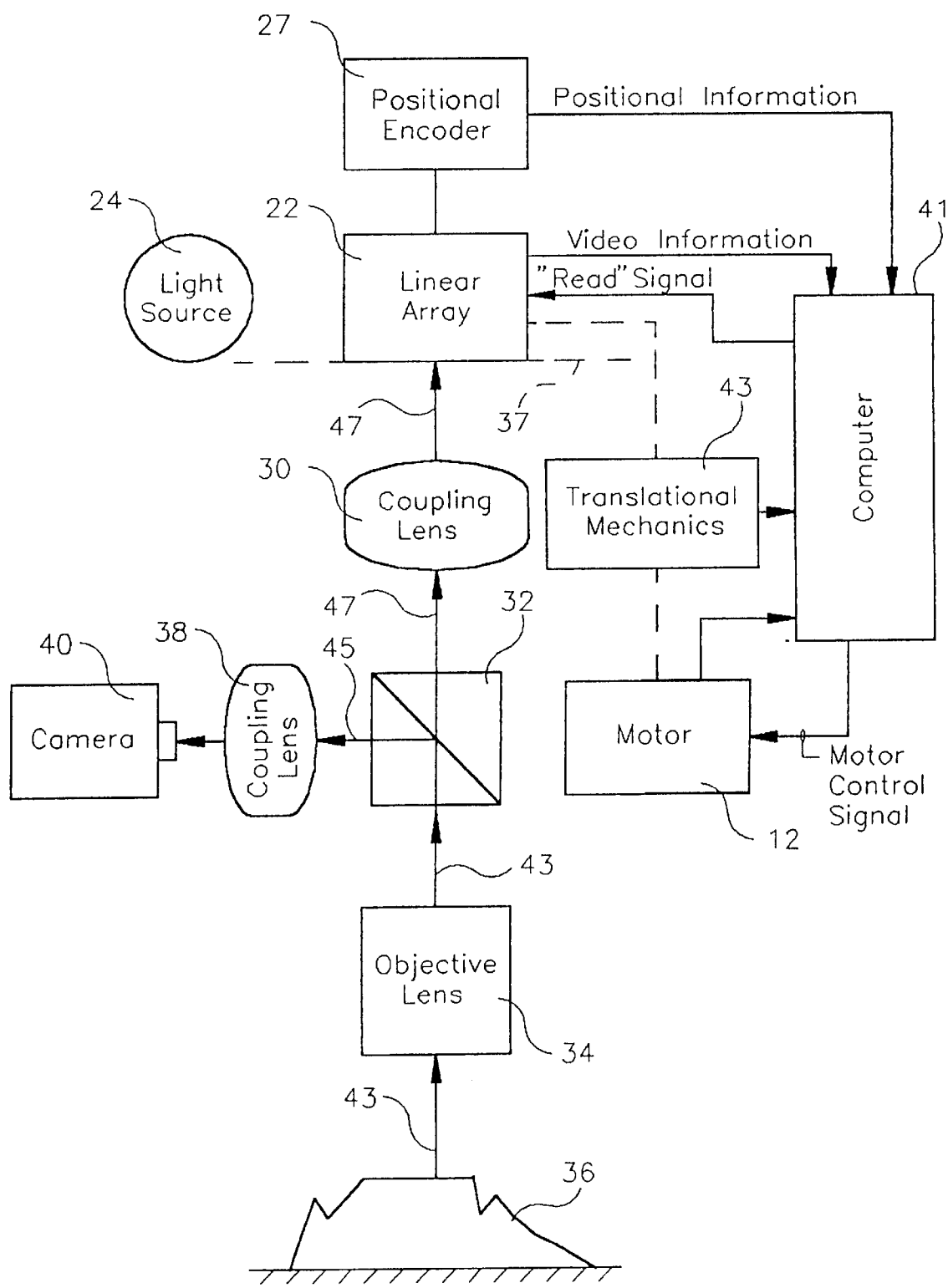
FIG. 3 is a block diagram of the control system of the present invention.

Generally, the inventive system is controlled by a computer 41 in the control system illustrated in FIG. 3. Computer 41, which may be a personal computer, receives positional information from positional encoder 27. This is information regarding the position of linear array 22. The positional information is processed by computer 41. Computer 41 outputs motor control signals to motor 12. Translational mechanics 43 are mechanically coupled to and driven by motor 12. Translational mechanics 43 are also mechanically coupled to and move linear array 22 along image plane 37 of object 36.

When linear array 22 is positioned over object 36, computer 41 signals linear array 22 to trigger a "read" of the detectors contained within linear array 22.

The video information captured by the linear array of detectors is then sent to computer 41 for storage. Motor 12 is then signaled by computer 41 to drive translational mechanics 43 which in turn moves linear array 22 into position for the next "read" of the linear array of detectors. When linear array 22 is in position for the next "read" of the detectors, computer 41 signals linear array 22 to trigger the "read".

Computer 41 processes the positional information provided by positional encoder 27. When linear array 22 moves a predetermined increment computer 41 will trigger a read of detectors 25. The predetermined increment is based upon the overall distance the linear array must move to adequately capture the image of object 36, divided by the width of the image taken by detectors 25. Therefore if the overall distance is 10 units and the detectors can capture an image with a width of 2 units, there would be 5 incremental divisions at which the computer will trigger a read of the detectors.

Once the linear array has been moved over the entire image, or the necessary portion, and detector reads have been performed at the appropriate incremental positions, computer 41 can then assemble each individual read into a composite of the entire image. The reconstructed image can be compared with known dimensional tolerances and the proper precision measurements can be taken.

When it is desired to operate the system of the present invention, an object 36 is placed within the field of view by a conveyor or other appropriate method. Light rays emitted by a light source 24 pass through coupling lens 30, beamsplitter 32, ard objective lens 34 thereby illuminating object 36. Bundles of light are then reflected by object 36, represented by a single principle ray 43, pass back through objective lens 34, and into beamsplitter 32.

A portion of light ray 43, represented by ray 45, is reflected by beamsplitter 32 through coupling lens 38 and into camera 40 for viewing by a user.

Another portion of light ray 43, represented by ray 47, passes through beamsplitter 32 where coupling lens 30 focuses the image upon image plane 37. Computer 41 then transmits a read signal to linear array 22, triggering a read of detectors 25 in the first incremental portion of the image. Video information of the first incremental portion is sent to computer 41 for storage and further processing. Computer 41 then signals motor 12 to drive translational mechanics 43, which in turn moves linear array 22 to the next incremental position. Positional encoder 27 transmits the positional information of linear array 22 to computer 41. When computer 41 determines that linear array 22 has been properly advanced to the next incremental position, a read signal is transmitted to linear array 22 thereby triggering a read of detectors 25 in the second incremental portion of the image. Video information of the second incremental portion is sent to computer 41 for storage and further processing. Computer 41 continues this incremental process until the complete image is captured.

Once the complete image has been captured, computer 41 can than assemble the entire image by placing each incremental portion of the image in sequential order. The completed image can than be measured by computer 41.

Figure 4:
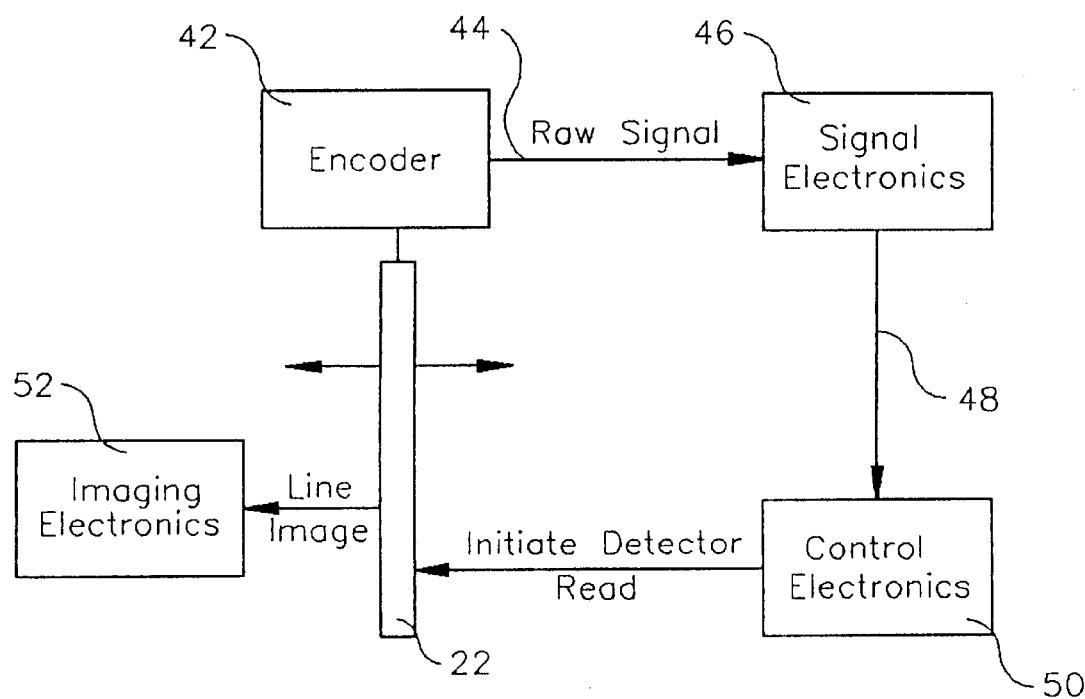
FIG. 4 is a block diagram of an alternative embodiment of the control system of the present invention.

Alternatively, as seen in FIG. 4, signal conditioning electronics can be employed to control the movement of linear array 22. An encoder 42 which may comprise a slider and a scale sends a raw signal 44 to a signal electronics board 46. Board 46 comprises signaling electronics which interpret the raw signal and send a pulse 48 to the control board 50 for linear array 22. The signaling electronics 46 can be programmed to count a certain number of encoder signals before sending the pulse to control electronics 50. Once control electronics 50 receives pulse 48 from signaled electronics 46 a detector read of line array 22 is initiated.

By using encoder signals to trigger a pulse which in turn causes a read of the linear array of detectors the lines can be specially separated at a variable but well defined rate. This ensures that the distance between images is accurately spaced which enables high precision reconstruction of the entire image.

The line image captured by linear array 22 is then sent to imaging electronics 52 which process the image. The image can be reconstructed line by line based upon the distances between each "read".

Figure 6:
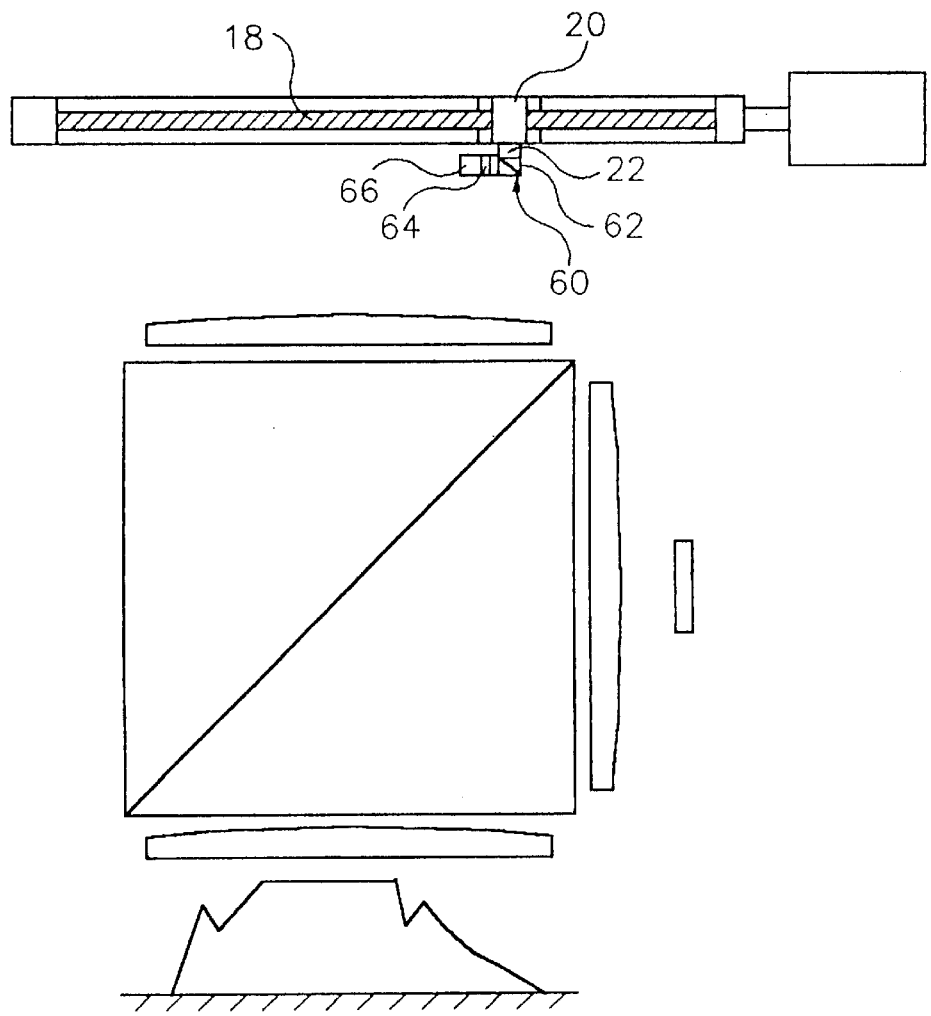
FIG. 6 is a side view of the present invention depicting an illumination system.
Figure 6B:
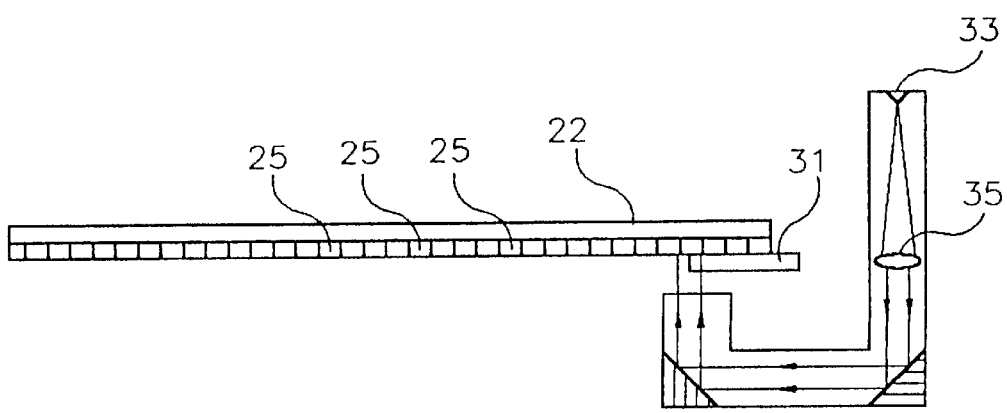
FIG. 6b is a schematic view depicting the reticle embodiment of the present invention.

Any inconsistencies in motion can be compensated for by the use of a high precision reticle, as illustrated in the schematic of FIG. 6b, comprised of a number of fiducial indices. A light source 33 can output light rays which can be collimated by use of lens 35, to provide collimated back light for optically projecting reticle 31 onto a portion of the image plane. Reticle 31 can be optically projected on one edge of the linear array 22 as it is being scanned. If reticle 31 is not touching the linear array of detectors than it must be imaged upon the array. The indices will then be present on the captured image once it is processed by imaging electronics 52. From these indices a computer system can calculate the appropriate pixel to inch ratio for the image in further compensate for any inconsistencies in scanning due to motion.

Alternatively a laser interferometer can be used to compensate for any linear variations in encoder response. These variations can be plotted and observed. This can be accomplished by using a computer to capture the image and compensate for any deviations in measurement accuracy with in a table containing data of encoder response errors. Therefore this invention removes any variability in scanning created by variations in more control, velocity, backlash, or any mechanical irregularities in the motion of the drive screw.

Figure 5:
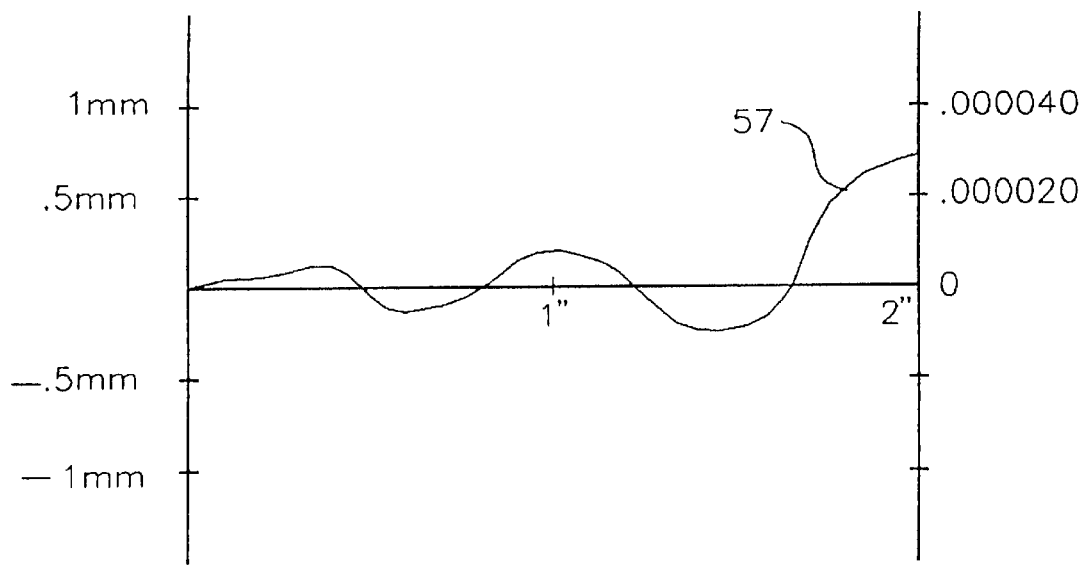
FIG. 5 is a table depicting encoder deviation as taken by a laser inferometer.

In the example shown in FIG. 5, a 1:1 optical system is shown. This assumes the magnification to equal 1. Therefore an object which measures exactly 2.000030 inches we would subtract 0.000030 inches from the measurement to correct it. As can be seen line 54 represents encoder deviation from the laser interfarometer reading.

An optical illumination system can be coupled to the linear array such that a very intense bar of illumination can be projected only on the area of the object that is currently being imaged on to the line array. As shown in FIG. 6 an optical illumination system 60 can be coupled to linear array 22. Optical illumination system 60 comprises a beamsplitter 62, collimating optics 64, and a laser or other point source of light 66.

In this illumination system laser 66 acts as a point source emitting light rays which pass through collimating optics 64. Once the light rays pass through collimating optics 64, they are dispersed along the length of linear array 22. A transmissive beamsplitter 62 reflects a portion of the light rays onto the portion of object 36 which is within the field of view of detectors 25. From the point of view of object 36, the illumination will appear to be coming from image plane 37.

Figure 7:
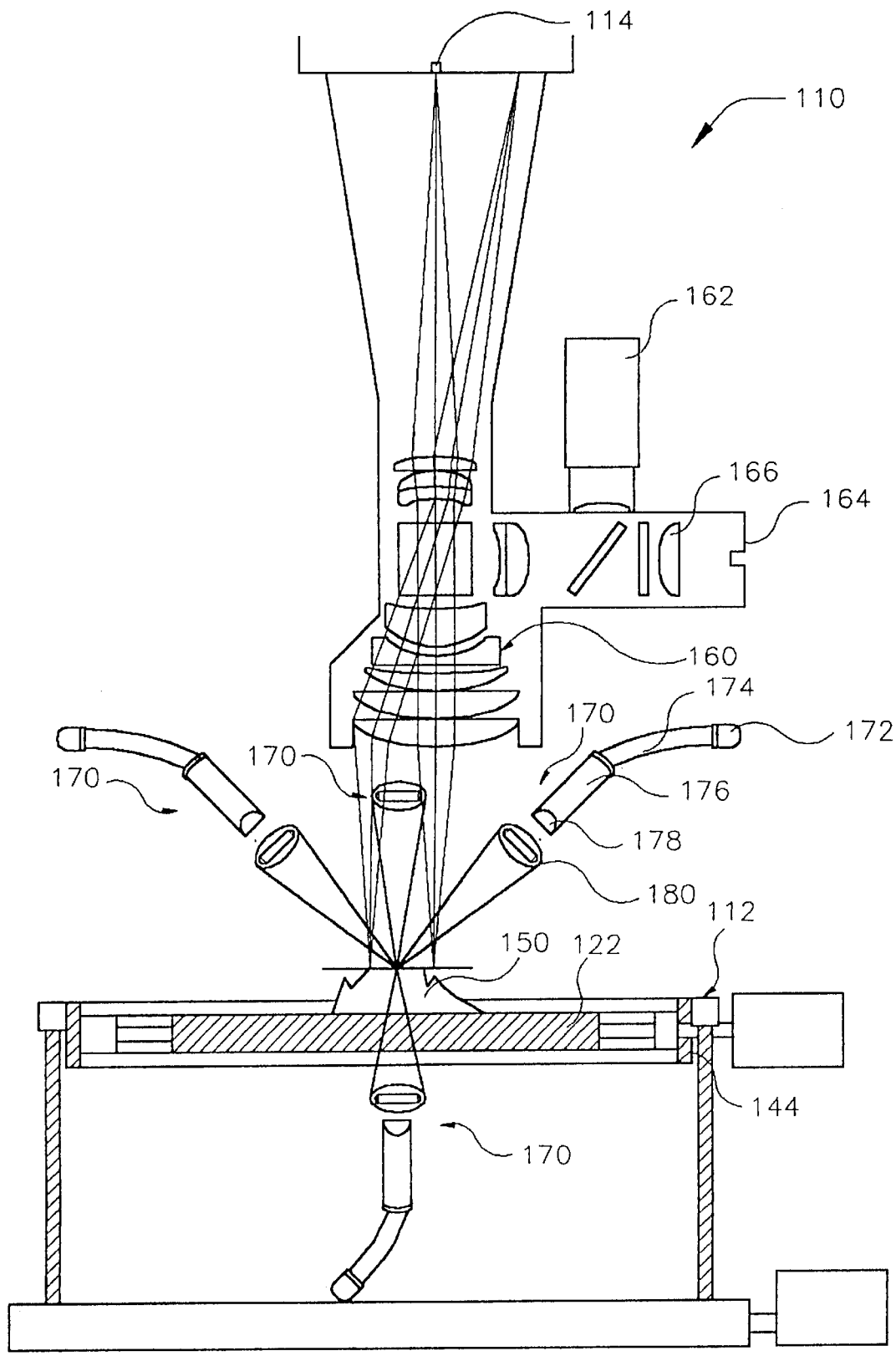
FIG. 7 is a side elevational view of an alternative embodiment of the present invention.
Figure 8:
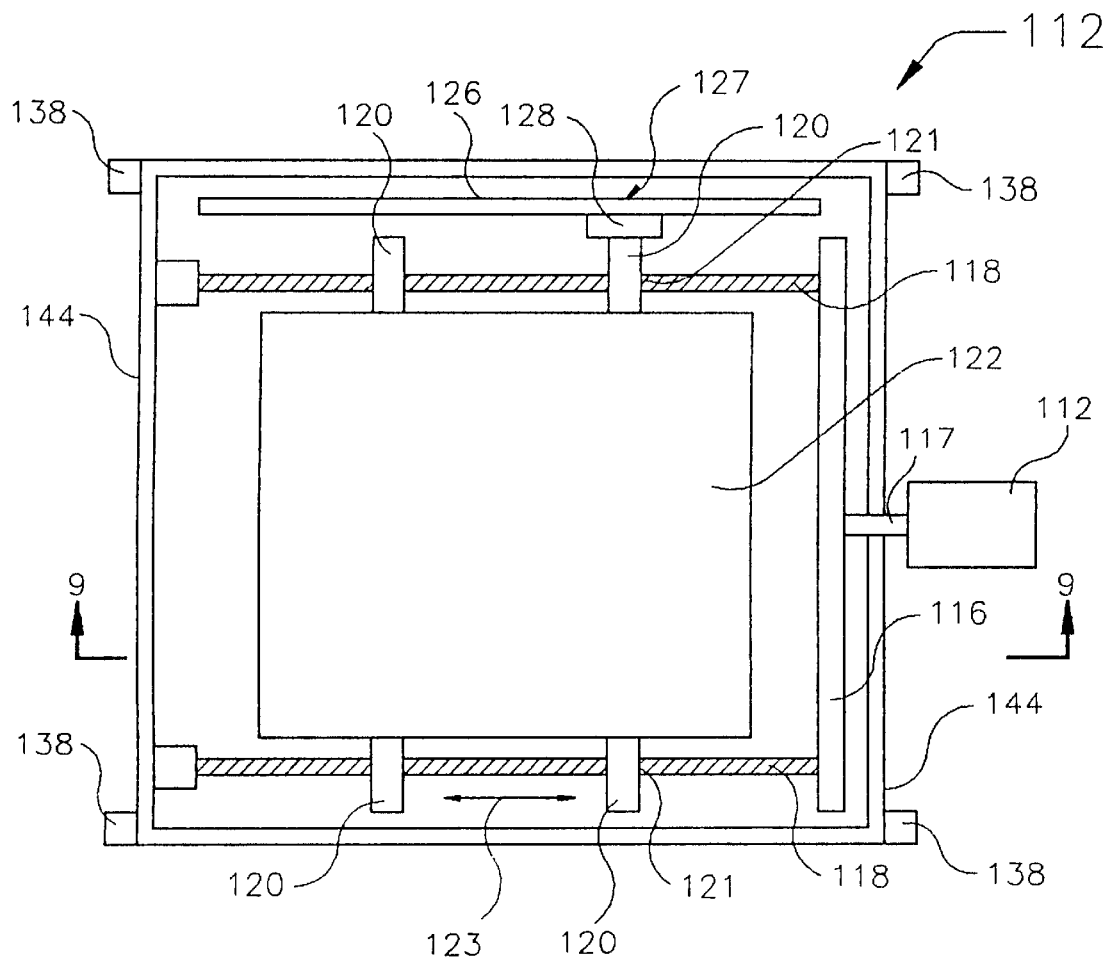
FIG. 8 is a top view of the movable stage in accordance with an alternative embodiment of the present invention.
Figure 9:
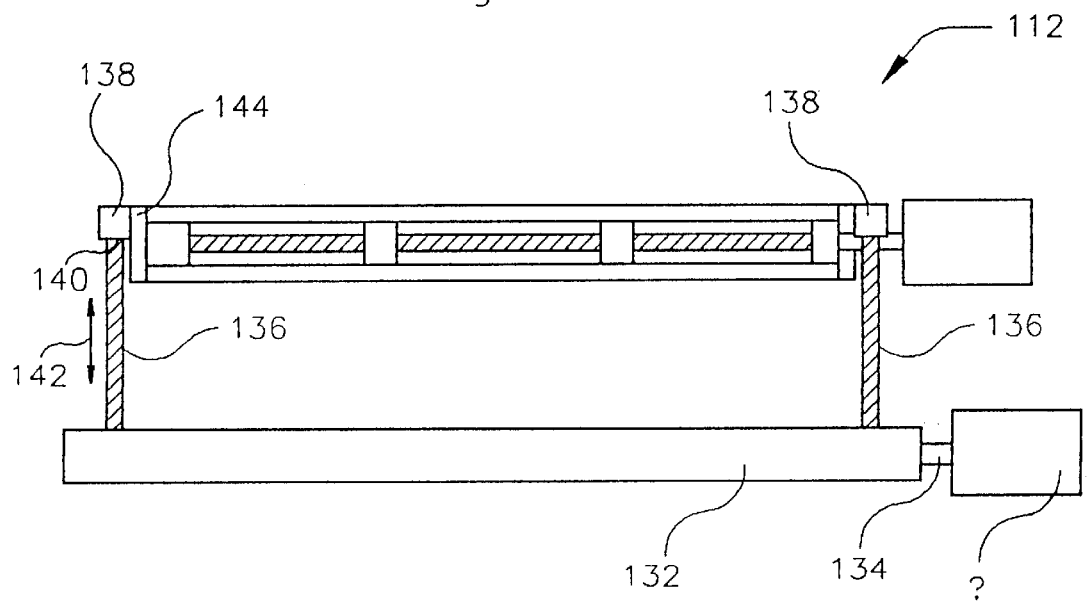
FIG. 9 is a cross section taken along lines 9—9 of FIG. 8.

An alternative embodiment is shown in FIGS. 7–9. In this embodiment a optical imaging device 110 is illustrated. The inventive device has a platform 112 which is illustrated in detail in FIGS. 8 and 9.

Platform 112 can move horizontally and vertically in relation to a stationary linear CCD array 114. Horizontal movement of platform 112 is driven by a motor 115 coupled to a gear box 116 by a drive shaft 117. Rotation of drive shaft 117 by motor 115 causes gears within gear box 116 to rotate drive screws 118.

Drive screws 118 are threaded to mate with a tapped block support 120. Block support 120 defines within itself a threaded whole 121, whose threads mate with the threads on its respective drive screw 118. Rotation above the drive screws 118 will cause block supports 120 to move in the directions indicated by arrows one 23. In accordance with this embodiment of the invention, both of the drive screws 118 have identical pitch threads. Accordingly, translational movements of each of the block supports 120 are identical to each other. Whether translational movement will be to the right or to the left will depend upon the direction of angular movement of screws 118.

A stage 122 is mounted to block supports 120. In accordance with the preferred embodiment four block supports are used. However, this number may be increased or decreased depending on the size and weight of stage 122. Stage 122 may be translucent to allow light to pass through it from the bottom to illuminate or assist and illumination of the object to be viewed. Translational movement of the block supports 120 directly results in a corresponding translational movement on the stage 122.

As illustrated in FIG. 8, an optical position sensing encoder is employed to determine the translational position of stage 122. Alternatively, a electromagnetic position transducer or other type of position detecting and transmitting device known in the art may be used. A positional encoder 127 comprises a slider 126 mounted on one of the block supports 120. Slider 126 is electromagnetically coupled with scale 128 to provide a signal which allows precise detection of the position of stage 122. Once the stage has reached a set of prEdetermined points, as determined by slider 126, the image output by linear CCD array 114 is downloaded to form a line and the raster image being acquired by the camera. A complete image can then be reconstructed by combining the line images associated with all of the points and the set of predetermined points. The spacing of these lines is based on the distance between reads as determined by slider 126.

Vertical movement of platform 112 is driven by motor 130 which is coupled to gearbox 132 by a drive shaft 134. Rotation of drive shaft 134 by motor 130 causes gears within gearbox 132 to rotate vertical drive screws 136.

Vertical drive screws 136 are threaded to mate with tapped vertical block supports 138. Vertical block supports 138 combined a threaded hold 140, whose threads mate with the threats on its respective vertical drive screw 136. Rotation of vertical drive screws 136 will cause vertical block supports 138 to move in the directions indicated by arrows 142. In accordance with this embodiment of the invention, all of the vertical drive screws 136 have identical pitch threads. Accordingly, translational movements of each of the vertical block supports 138 are identical to each other. Whether translational movement be up or down will depend upon the direction of a healer movement of the vertical drive screws 136.

Vertical block supports 138 are mounted to a frame 144 which supports the entire horizontal movement assembly earlier described. Frame 144 is mounted on and extends between the vertical block supports 138. Therefore translational movement of the vertical block supports 138 result and a corresponding transitional movement of the platform 112.

An optical position sensing encoder is preferably employed to determine the vertical translational position of stage 122. However, a positional encoder which comprises a slider 146 and a scale 128 can be used. Slider 146 is mounted on one of the vertical block supports 138. Slider 146 is electromagnetically coupled with scale 148 to provide a signal which allows precise detection of the position of stage 122. Once the stage 122 has reached each of a set of predetermined vertical points, as determined by slider 146, the image output by the linear CCD array is downloaded to form a line in the raster image being acquired by the camera. A complete image can then be reconstructed by combining the line images associated with all of the points and the set of predetermined points. The spacing of these lines is based on the distance between reads as determined by slider 146.

Figure 11:
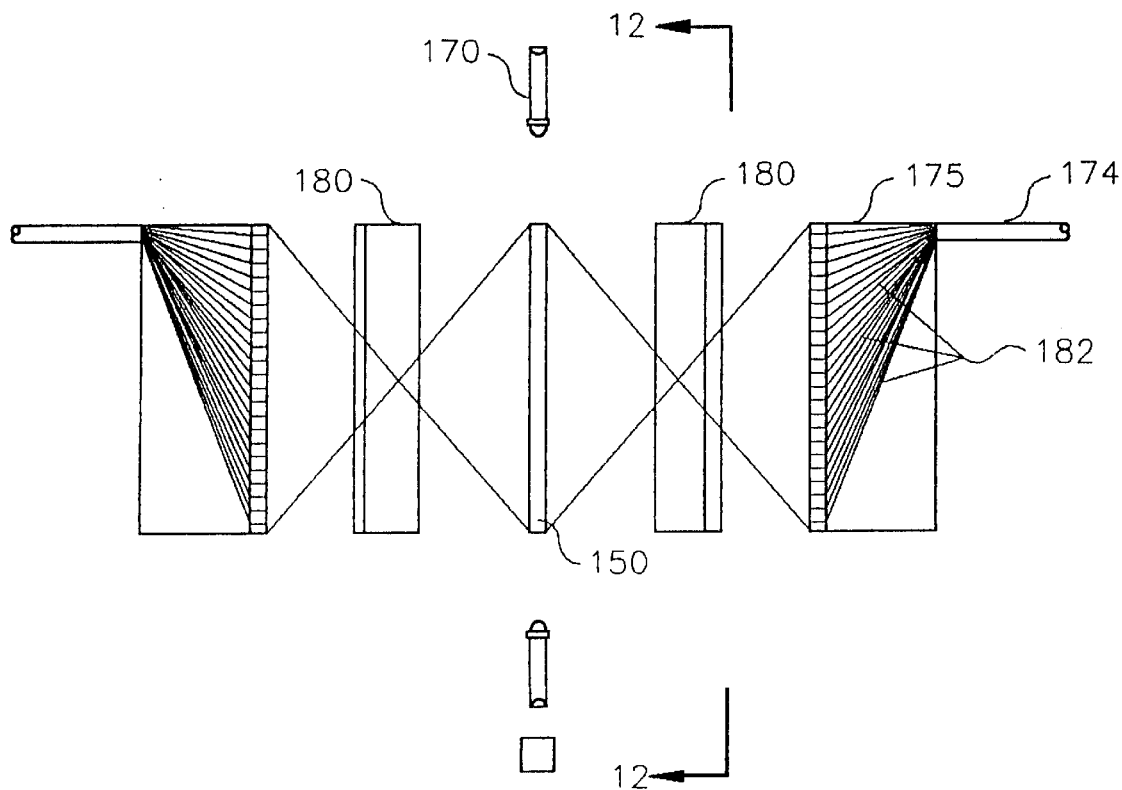
FIG. 11 is a top view of an inventive illumination system of the present invention.
Figure 12:
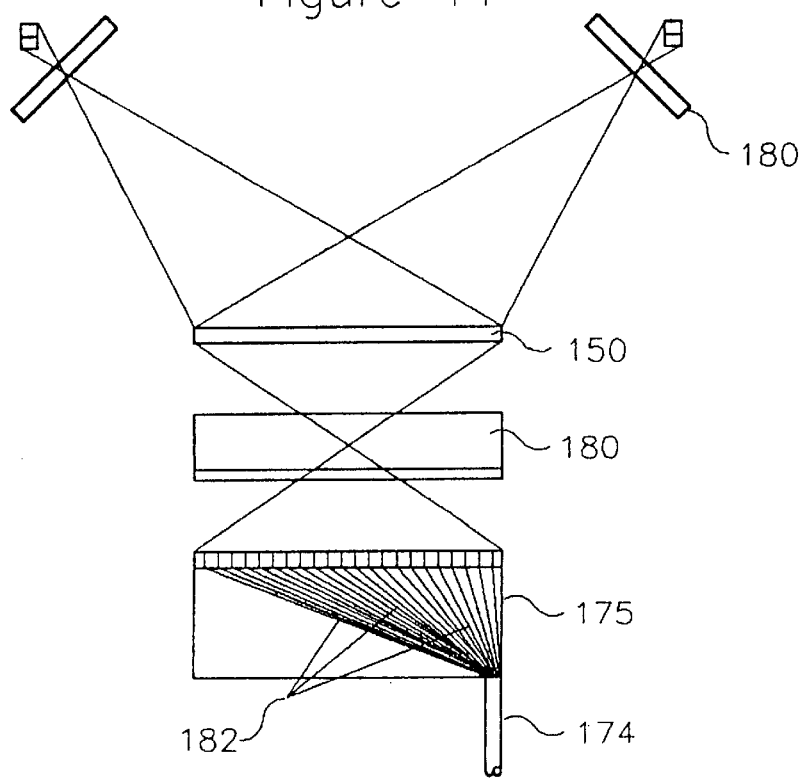
FIG. 12 is a view along lines 12—12 of FIG. 11 depicting an inventive illumination system in accordance with the present invention.

The illumination of object 150 is provided by light assemblies 170. Light assemblies 170 consist of a lamp 172, a fiber optic bundle 174,a fiber optic light line 175 (preferably of the type manufactured by Fostic Fiberoptics of Auburn, N.Y.), and cylindrical lens 180. As shown in FIGS. 11–12, light assemblies 170 are placed around object 150. These light assemblies can be independently controlled and turned on and off in various configurations. By turning specific light assemblies on and off in various configurations, helps create shadows which enable improved accuracy of measurement of the object under observation.

Figure 10:
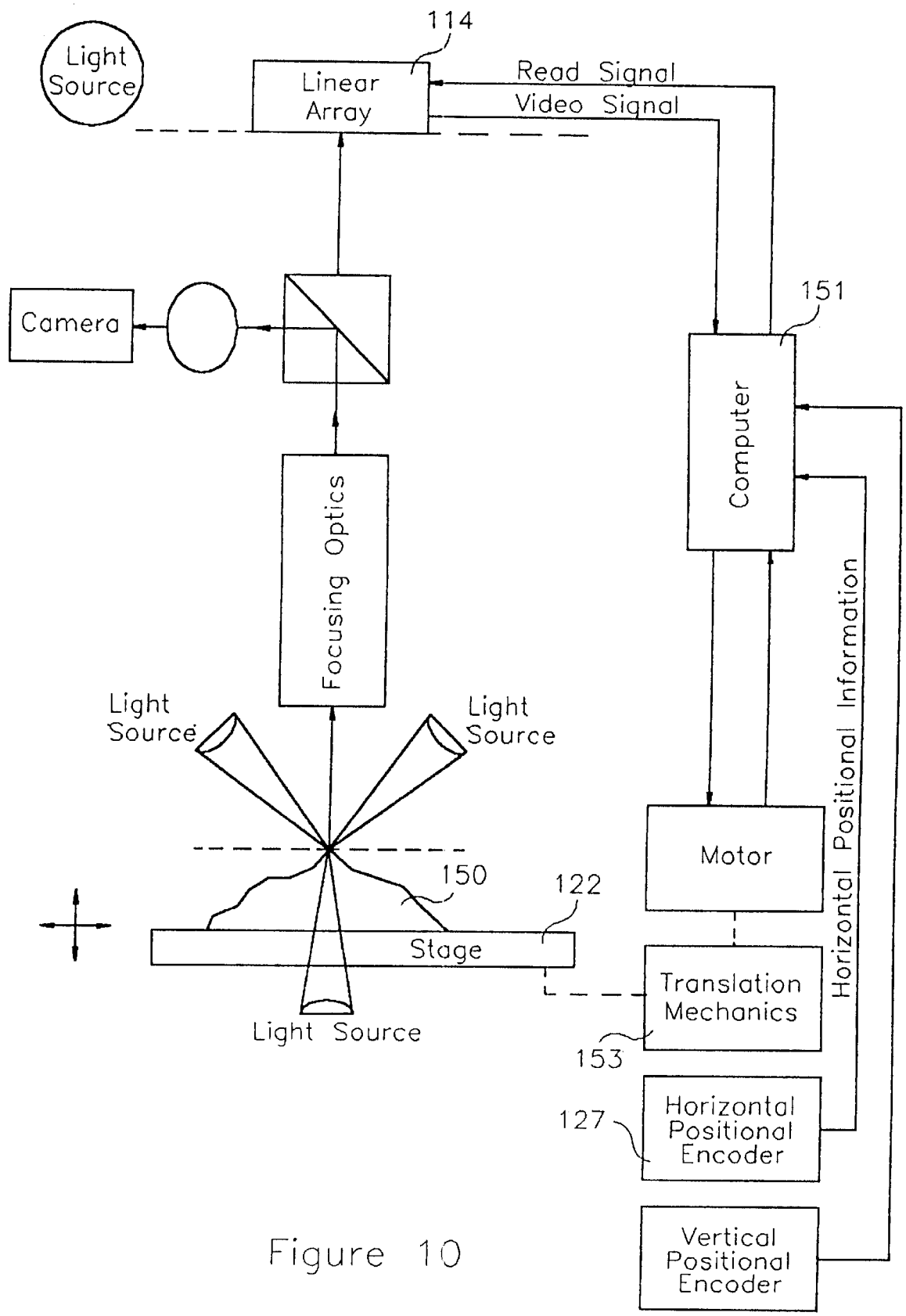
FIG. 10 is a block diagram depicting the control system of an alternative embodiment of the present invention.

The process of capturing a three-dimensional image is illustrated in the schematic diagramed and FIG. 10. When stage 122 positions object 150 in the initial position in the initial horizontal plane, computer 151 signals linear array 114 to trigger a read off the detectors. The video information captured by linear array 114 is then sent to computer 151 for storage. Motor 115 is then signaled by computer 151 to drive translational mechanics 153 and which can turn move stage 122 and object 150 into position for the next read off linear array 114. When silage 122 and object 150 are in position for the next read, computer 151 signals linear array 114 to trigger the read.

Computer 151 processes up a positional information provided by horizontal positional encoder 127. When stage 122 moves a predetermined increment computer 151 will trigger a read off linear array when 14. The predetermined increment is based upon the overall distance the linear array must move to adequately capture the image of object when 50, divided by the width of the image taken by linear array 114. If the overall distance is 10 units and the detectors can capture and image with a width of two units, there would be five incremental divisions at which the computer will trigger a read of the detectors.

Alternatively the system may overlap images captured by linear array 114. Therefore if the overall distance is 10 units ended detectors can capture and image with a width of two units, there would be nine incremental divisions at which the computer could trigger a read of the detectors. The first incremental division would begin at location 0,0 and end at location 0,2, width being next incremental division beginning at location zero, 1 and ending at location zero, 3. This overlapping of images allows greater pixel density which is interpreted through the use both software by computer 151.

Once linear array 114 and has captured the entire image, or the necessary portion, in the first horizontal plane, computer 151 can then assemble each individual read iniLo a composite of the first horizontal plane. Computer 151 then signals motor 130 to drive translational mechanics 153 which in turn move stage 122 vertically into the correct incremental position for reading the next horizontal plane. Once stage 122 has moved into position vertically, in other horizontal read of the object can take place. This process is then repeated until the entire three dimensional image of the object has been captured. Computer 151 can then assemble each individual horizontal read into a three dimensional composite on the entire image. The reconstructed image can be compared with known dimensional tolerances in the proper precision measurements can be taken.

Figure 13:
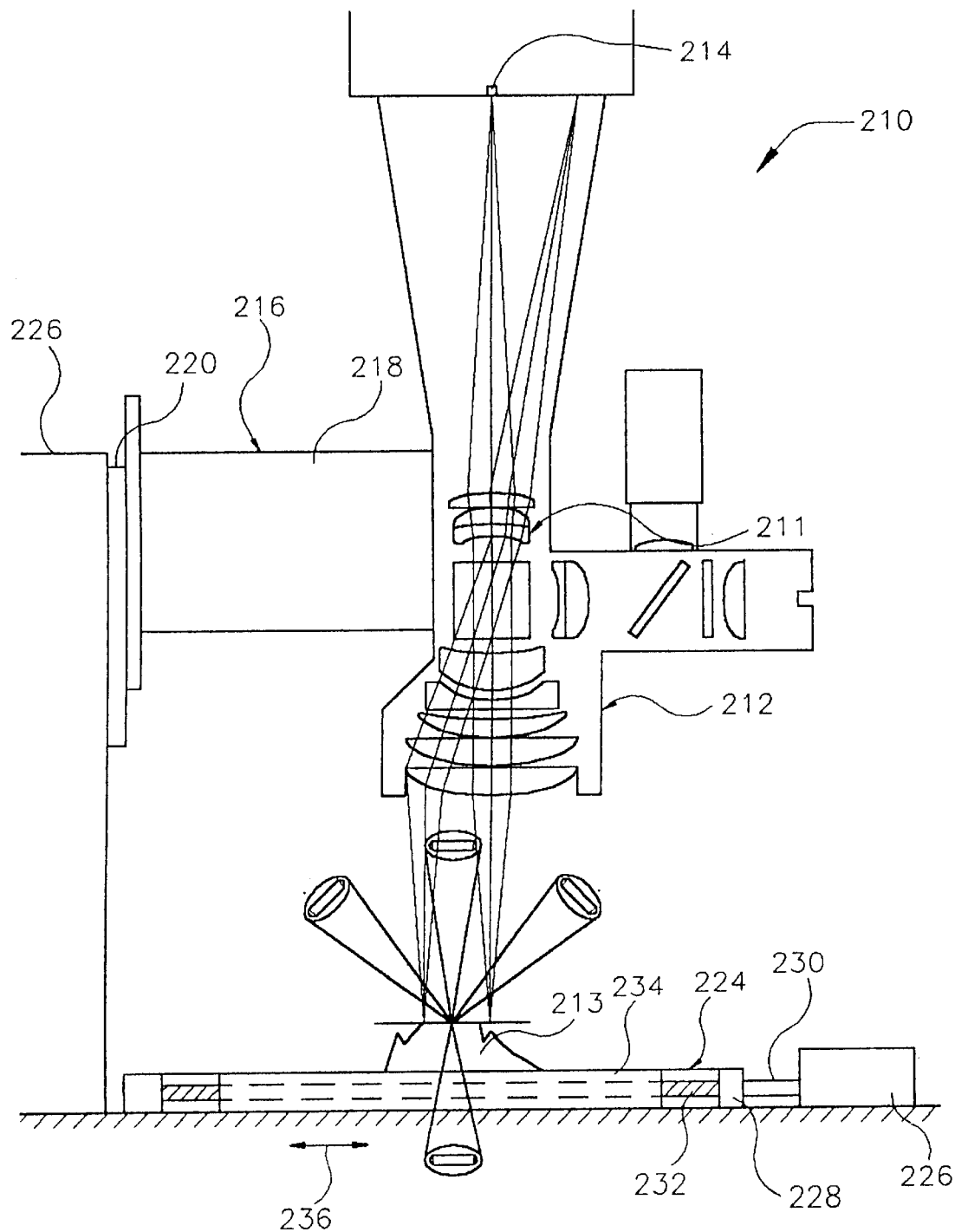
FIG. 13 is an side elevational view of an alternative embodiment of the present invention.

An alternative embodiment of the present invention is illustrated in FIG. 13. Camera 210 comprises a housing 212 which contains focusing optics 211 which focused the image of an object 213 along in image plane which can be captured by a linear array of detectors 214. Housing 212 is coupled to a vertical positioning device 216. Vertical positioning device 216 comprises a support arm 218, translational mechanics 220 and rigid support member 222. Translational mechanics 220 is coupled to a positional encoder which can incrementally control the vertical movement of housing 212.

Object 213 is placed upon horizontal positioning device 224. Horizontal positioning device 224 comprises a motor 226 which is coupled to a gear box 228 by a drive shaft 230. Rotation of drive shaft 230 by motor 226 causes gears within gear box 228 to rotate drive screws 232. Drive screws 232 are threaded to mate with a tapped block support which is coupled to a stage 234. Rotation of the drive screws 232 will cause stage 234 to horizontally move in the directions indicated by arrows 236. Furthermore, stage 234 may be equipped with another set of translational mechanics, or compound translational mechanics which permit movement along both the x and y axis of the plane in which stage 234 resides. This feature allows stage 234 to move in multiple directions. A horizontal positioning encoder is electromagnetically or optically coupled with a scale to provide a signal which allows the precise positioning of stage 234.

Similar to the earlier illustrated embodiments, when it desired to capture a three-dimensional image in accordance with the present embodiment, the object is moved by horizontal positioning device 224 through the focal point of linear array 214. A computer signals linear array 214 to send and image of object 213 at predetermined increments. Once the object has been captured at one focal plane the vertical positioning device moves housing 212 and linear array 214 to a new vertical position allowing the process to be repeated and thereby capturing images on a new focal plane. A computer can then reconstruct a three-dimensional image of the object by using images from each focal plane. This three-dimensional image can then be compared to known tolerances to determine whether the same are within the standard tolerances for the object.

While an illustrated embodiment of the invention has been described, it is, of course, understood that various modifications of the invention may be made by those of ordinary skill in the art without departing from the spirit and scope of the invention which is limited and defined only by the appended claims.

What is claimed is:

1. An optical imaging apparatus having focusing optics, with an optical axis, for sending light emitted from an object under observation placed within the field of view of said optical imaging apparatus along said optical axis from said object under observation to be focused on a focal plane, said optical imaging apparatus comprising:

(a) a linear array of detectors, said linear array of detectors being positioned in said focal plane, said linear array of detectors outputting an image of a portion of said object under view;

(b) a platform configured and dimensioned to support said object under observation in a known position with respect to said platform;

(c) a moveable mounting responsive to horizontal and vertical mechanical drive forces to move said platform to a desired horizontal and vertical position;

(d) a vertical motor having a vertical drive member for applying a vertical drive force to said movable mounting;

(e) a horizontal motor having a horizontal drive member for applying a horizontal drive force to said movable mounting;

(f) a light source emitting light onto said object under observation;

(g) a horizontal position transmitting device coupled to said platform and having the ability to transmit positional data on said platform;

(h) a vertical position transmitting device coupled to said platform and having the ability to transmit positional data on said platform;

(i) a computer receiving horizontal positional data from said horizontal position transmitting device and receiving vertical positional data from said vertical position transmitting device, said computer using said horizontal and said vertical positional data to calculate the position of said object under observation with respect to said linear array of detectors, said computer using image data output by said linear array and positional data output by said horizontal position transmitting device and vertical position transmitting device to generate a three dimensional image.

2. An optical imaging apparatus as in claim 1, wherein said image is compared by said computer to an image stored in memory to generate a comparison of said image to said stored image.

3. An optical imaging apparatus as in claim 2, wherein said comparison is a quality assessment.

4. An optical imaging apparatus as in claim 1, wherein said comparison is a tolerance assessment.

5. An optical imaging apparatus as in claim 1, wherein said image is a three dimensional image.

6. An optical imaging apparatus as in claim 1, wherein said image is a two dimensional image.

7. An optical imaging apparatus as in claim 6, wherein said two dimensional image is generated by said computer combining image data output by said linear array of detectors at various vertical positions.

8. An optical imaging apparatus having focusing optics with an optical axis, for sending light emitted from an object under observation placed within the field of view of said optical imaging apparatus along said optical axis from said object under observation to be focused on a focal plane, said optical imaging apparatus comprising:

(a) a linear array of detectors, said linear array of detectors being positioned in said focal plane, said linear array of detectors outputting an image of a portion of said object under view;

(b) a support structure configured and dimensioned to support said focusing optics and said linear array of detectors in a known position with respect to said support structure;

(c) a platform configured and dimensioned to support said object under observation in a known position with respect to said platform;

(d) a first moveable mounting responsive to horizontal mechanical drive forces to move said platform to a desired horizontal position;

(e) a horizontal motor having a horizontal drive member for applying a horizontal drive force to said first movable mounting;

(f) a second moveable mounting responsive to vertical mechanical drive forces to move said support structure to a desired vertical position;

(f) a vertical motor having a vertical drive member for applying a vertical drive force to said second movable mounting;

(f) a light source emitting light onto said object under observation;

(g) a horizontal position transmitting device coupled to said platform and having the ability to transmit positional data on said platform;

(h) a vertical position transmitting device coupled to said support structure and having the ability to transmit positional data on said support structure;

(i) a computer receiving horizontal positional data from said horizontal position transmitting device and receiving vertical positional data from said vertical position transmitting device, said computer using said horizontal and said vertical positional data to calculate the position of said object under observation with respect to said linear array of detectors, said computer using image data output by said linear array and positional data output by said horizontal position transmitting device and vertical position transmitting device to generate an image.

9. An optical imaging apparatus as in claim 8, wherein said platform has a direction of movement horizontally away from a first point and towards a second point, said linear array of detectors having a longitudinal axis transverse to said direction of movement, said longitudinal axis having a right end and a left end, said light source further comprising a first light source emitting a first elongated line of light on said object under observation, said first elongated line of light being transverse to said direction of movement, said first light source being on the same side of said optical access as said right end.

10. An optical imaging apparatus as in claim 9, wherein a second light source is emitting a second elongated line of light on said object under observation, said second elongated line of light being transverse to said direction of movement, said second light source being on the same side of said optical axis as said left end.

11. An optical imaging apparatus as in claim 10, wherein a third light source is emitting a third elongated line of light on said object under observation, said third elongated line of light being transverse to said direction of movement, said third light source being positioned on the same side of said optical axis as said first point.

12. An optical imaging apparatus as in claim 11, wherein a fourth light source is emitting a fourth elongated line of light on said object under observation, said fourth elongated line of light being transverse to said direction of movement, said fourth light source being positioned on the same side of said optical axis as said second point.

13. An optical imaging apparatus as in claim 8, wherein a fifth light source is emitting a fifth elongated line of light on said object under observation, said fifth elongated line of light being transverse to said direction of movement, said fifth light source being positioned beneath said object under observation.

14. An optical imaging apparatus as in claim 8, wherein a sixth light source is emitting a sixth elongated line of light on said object under observation, said sixth elongated line of light being transverse to said direction of movement, said sixth light source being positioned to project said sixth elongated line of light along said optical axis from above said object under observation.

15. An optical imaging apparatus as in claim 1, wherein a viewing camera is positioned on said optical axis.

16. An optical imaging apparatus as in claim 1, wherein said viewing camera has a focusing mechanism which allows a user to focus and preview said image being focused on said focal plane.

17. A method of increasing pixel resolution in an optical imaging apparatus according to claim 1, the apparatus having a linear array of detectors which capture an image of an object placed on a platform within the field of view of said linear array of detectors, said linear array of detectors having a direction of movement horizontally away from a first point and towards a second point, said linear array of detectors having a longitudinal axis transverse to said direction of movement, said method comprising the steps of:

a) signaling said linear array to capture a first area of said image of said object;

b) moving said linear array a known distance in the direction of said second point;

c) signaling said linear array to capture a second area of said image of said object, said second area of said image containing a portion of said first area;

d) moving said linear array a known distance in the direction of said second point;

(e) signaling said linear array to capture a third area of said image of said object, said third area of said image containing a portion of said second area; and f) moving said linear array to subsequent positions in the direction of said second point and signaling subsequent captures of subsequent areas of said image of said object, each of said subsequent captures capturing a portion of the preceding area captured.

18. A method as in claim 17, wherein said computer compiles overlapping portions of said image data to generate an image of said object.

* * * * *